US012798254B2

(12) United States Patent
Kitase et al.

(10) Patent No.: US 12,798,254 B2
(45) Date of Patent: Nov. 17, 2026

(54) LIQUID CONTAINER AND LIQUID REPLENISHMENT SYSTEM

(71) Applicant: CANON KABUSHIKI KAISHA, Tokyo (JP)

(72) Inventors: Yushi Kitase, Tokyo (JP); Yoshito Fuse, Kanagawa (JP); Ryoji Inoue, Kanagawa (JP); Manabu Ohara, Tokyo (JP); Noriyasu Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/668,915

(22) Filed: May 20, 2024

(65) Prior Publication Data

US 2024/0391243 A1 Nov. 28, 2024

(30) Foreign Application Priority Data

May 23, 2023 (JP) ................................. 2023-084308

(51) Int. Cl.
*B41J 2/175* (2006.01)

(52) U.S. Cl.
CPC ......... *B41J 2/1754* (2013.01); *B41J 2/17523* (2013.01)

(58) Field of Classification Search
CPC ... B41J 2/1754; B41J 2/17523; B41J 2/17503
See application file for complete search history.

(56) References Cited

U.S. PATENT DOCUMENTS 5,477,963 A * 12/1995 Mochizuki ........... B41J 2/17513 206/524.8
6,450,631 B1 * 9/2002 Hayashi ............... B41J 2/17513 347/108
2019/0224978 A1 * 7/2019 Miyashita ............ B41J 2/17596

FOREIGN PATENT DOCUMENTS

EP 0949080 A2 * 10/1999 .......... B41J 2/17513
JP 2017222152 A 12/2017

* cited by examiner

*Primary Examiner* — Stephen D Meier
*Assistant Examiner* — Thomas Ray Knief
(74) *Attorney, Agent, or Firm* — Canon U.S.A., Inc. IP Division

(57) ABSTRACT

A liquid container includes a liquid containing portion configured to contain liquid, an outlet portion including an outlet port configured to discharge therethrough the liquid contained in the liquid containing portion, and a protection portion configured to cover the outlet port of the outlet portion. The protection portion has a first opening portion located above the outlet port. Where a diameter of the opening portion is defined as D, and a distance between the outlet port of the outlet portion and the opening portion in a vertical direction is defined as L, inequality (1) is satisfied.

7 Claims, 11 Drawing Sheets

LIQUID CONTAINER AND LIQUID REPLENISHMENT SYSTEM

BACKGROUND

Field

The present disclosure relates to a liquid container and a liquid replenishment system.

Description of the Related Art

There is known a liquid container that can replenish a liquid tank for containing liquid therein with the liquid. The liquid is used by a liquid discharge apparatus (image recording apparatus), such as an ink jet recording apparatus, including a liquid discharge head. For example, the liquid container includes an outlet port through which the liquid is injected into the liquid tank. The liquid tank inside the liquid discharge apparatus includes a needle that extends and has a flow path through which the inside and the outside communicate, and the liquid tank can be replenished with the liquid by inserting the needle thereof into the outlet port of the liquid container. In this type of liquid container, as discussed in Japanese Patent Application Laid-Open No. 2017-222152, to prevent user's hands and objects around the user from becoming dirty, a valve having a slit is arranged at a leading end of the outlet port to prevent liquid leakage. The valve is opened by the needle inserted into the outlet port of the liquid container, and the liquid tank is replenished with the liquid.

Japanese Patent Application Laid-Open No. 2017-222152 further discusses that when the liquid is injected from the liquid container to the liquid tank, since the valve is opened in a state of being positioned with respect to the liquid tank, troubles such as liquid leakage, which can occur when the valve is opened, are prevented.

Further, Japanese Patent Application Laid-Open No. 2017-222152 also discusses a configuration in which a positioning portion of the above-described liquid container is formed of a member separate from an outlet port forming portion to increase a degree of freedom of design of the positioning portion and the outlet port forming portion, and in which the liquid tank has depressed portions open in the same direction as that of the needle in an area radially extending from the outlet port forming portion, and the positioning portion of the liquid container has protruding portions that engage with the depressed portions in an area outside the outlet port and extending in a radial direction with the outlet port as the center. With this configuration, in a case where the depressed portions of the liquid tank and the protruding portions of the liquid container do not engage with each other, the needle is not inserted into the outlet port, and the liquid tank is not replenished with the liquid, thereby inappropriate liquid replenishment is prevented.

Further, the configuration discussed in Japanese Patent Application Laid-Open No. 2017-222152 is advantageous in reducing stocks and spaces in a manufacturing process by using a common outlet port forming member and a common valve member regardless of the type of liquid, and changing as appropriate only a positioning member that is smaller in size than the outlet port forming member, depending on the type of liquid.

SUMMARY

According to an aspect of the present disclosure, a liquid container includes a liquid containing portion configured to contain liquid, an outlet portion including an outlet port configured to discharge therethrough the liquid contained in the liquid containing portion, and a protection portion configured to cover the outlet port of the outlet portion, wherein the protection portion has a first opening portion located above the outlet port, and wherein where a diameter of the opening portion is defined as D, and a distance between the outlet port of the outlet portion and the opening portion in a vertical direction is defined as L, inequality (1) is satisfied:

$$L > 5.5 - 5.5\sqrt{1 - \frac{D^2}{169}}\ (D < 13). \tag{1}$$

Further features of the present disclosure will become apparent from the following description of exemplary embodiments with reference to the attached drawings.

DESCRIPTION OF THE EMBODIMENTS

Figure 1:
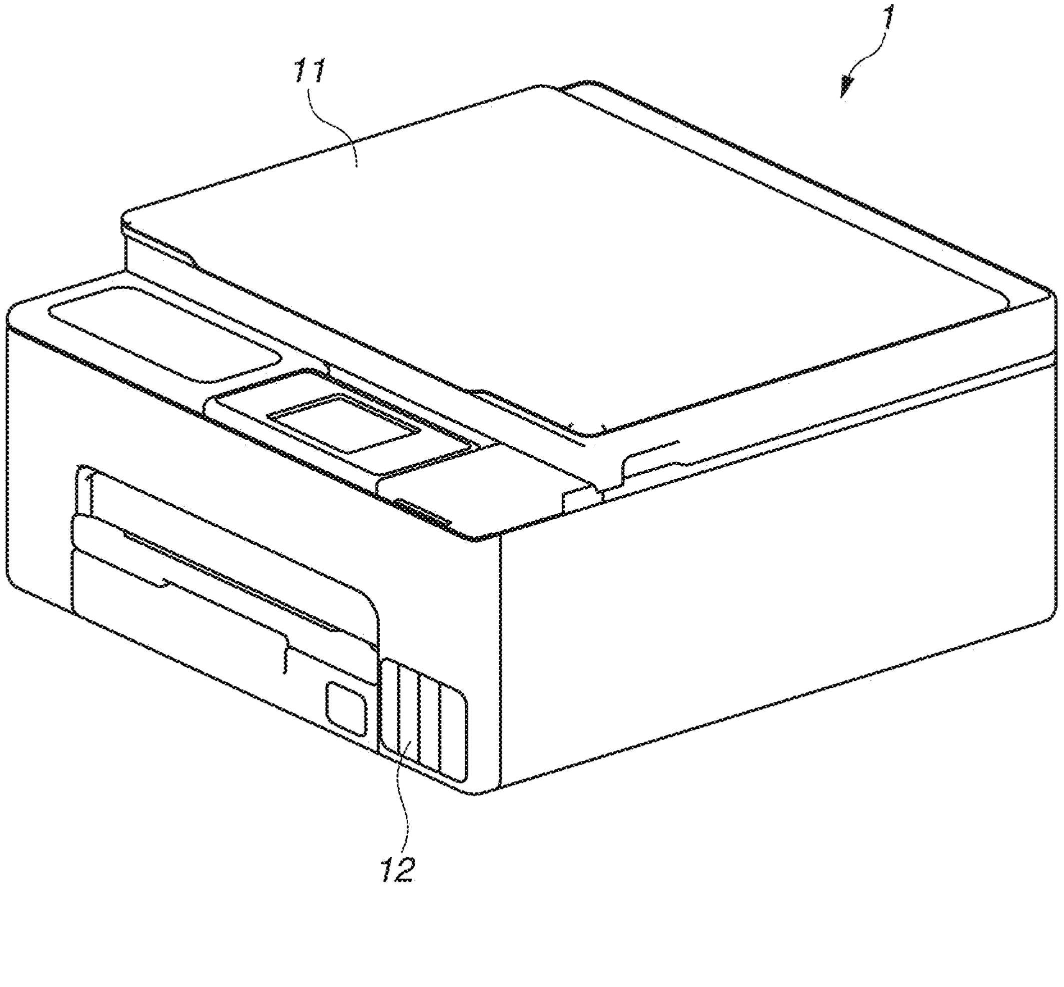
FIG. 1 is a perspective view illustrating an external appearance of a liquid discharge apparatus.

With the configuration discussed in Japanese Patent Application Laid-open No. 2017-222152, a small space may inevitably be generated between the valve and the needle when the liquid is injected, and the liquid may be held in the space. If the liquid container is removed in this state, there may be a case where the liquid held in the small space is left adhering to the vicinity of the outlet port of the liquid container. In such a case, when a cover member for closing the outlet port of the liquid container is attached to the liquid container, if a user accidentally touches the vicinity of the outlet port with a user's finger, the user's finger may touch the liquid, to further make the user's clothes or a desk dirty.

In addition, if a droplet of the liquid adhering to the vicinity of the outlet port drips in an outer area of the outlet port in a state where the liquid container is standing upright, there may be a case where the liquid reaches a side surface of the liquid container. Accordingly, considering the user's convenience, a mechanism that prevents the user from accidentally touching the vicinity of the outlet port is required.

The present disclosure is directed to a liquid container and a liquid replenishment system capable of improving user's convenience.

Hereinbelow, with reference to the attached drawings, exemplary embodiments will be described. The same components are described with the same reference numerals assigned. Further, relative arrangements and shapes of components described in the exemplary embodiments are merely examples.

FIG. 1 is a perspective view illustrating an external appearance of a liquid discharge apparatus 1 according to an exemplary embodiment. The liquid discharge apparatus 1 illustrated in FIG. 1 is a serial-type ink jet recording apparatus. The liquid discharge apparatus 1 illustrated in FIG. 1 includes a housing 11 having a rectangular parallelepiped shape with the right-and-left direction as a longitudinal direction, and liquid tanks 12 arranged inside the housing 11. Each of the liquid tanks 12 contains ink that is a liquid to be discharged to a recording medium (not illustrated).

Figure 2:
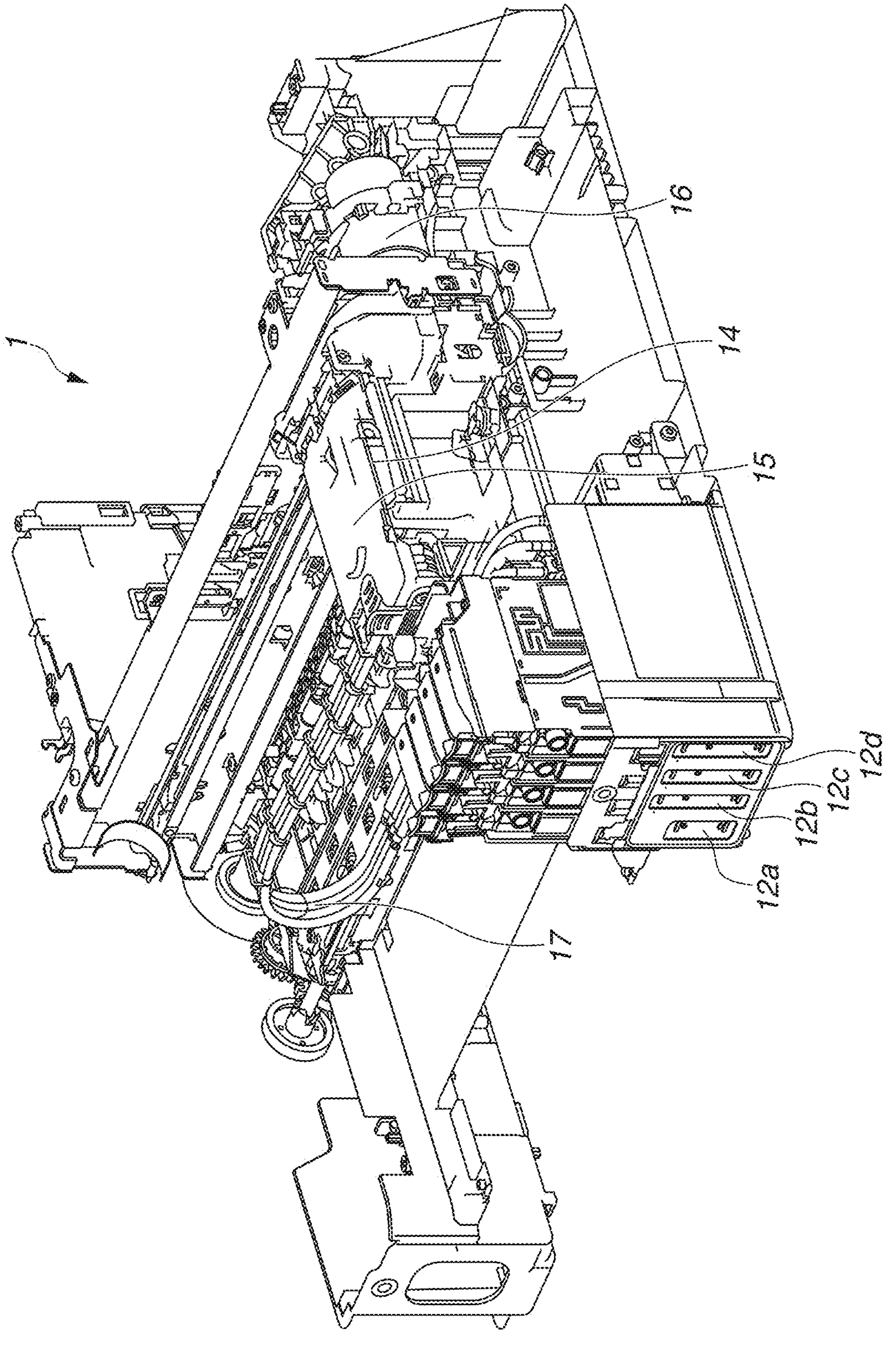
FIG. 2 a perspective view illustrating an internal configuration of the liquid discharge apparatus.

FIG. 2 is a perspective view illustrating an internal configuration of the liquid discharge apparatus 1 illustrated in FIG. 1. In FIG. 2, the liquid discharge apparatus 1 includes conveyance rollers (not illustrated) for conveying a recording medium (not illustrated), a carriage 15 with a recording head 14 arranged on a lower side thereof to discharge the liquid, and a carriage motor 16 for driving the carriage 15. The carriage 15 can be moved reciprocally in right and left directions by the carriage motor 16. The recording medium is not limited as long as an image can be formed thereon with the ink discharged from the recording head 14. For example, as the recording medium, paper, cloth, a label side of an optical disk, a plastic sheet, or an overhead projector (OHP) sheet can be used.

An ink is contained in each of the liquid tanks 12, and supplied to the recording head 14 via a liquid flow path 17 to be discharged from the recording head 14. In the present exemplary embodiment, inks of four colors (e.g., cyan, magenta, yellow, and black) are used, and as the liquid tanks 12, four liquid tanks 12*a* to 12*d* respectively containing the inks of different colors are arranged. Hereinbelow, in a case where an individual liquid tank is to be described in a distinguished manner, an alphabet is added at the end of a reference numeral for the liquid tank, such as the liquid tanks 12*a*, 12*b*, 12*c*, and 12*d*. In a case where a description is given of any liquid tank, the liquid tank is referred to as the liquid tank 12. The liquid tanks 12*a* to 12*d* (or liquid tanks 12) for different colors are arranged at a front portion of the liquid discharge apparatus 1 inside the housing 11.

Figure 3A:
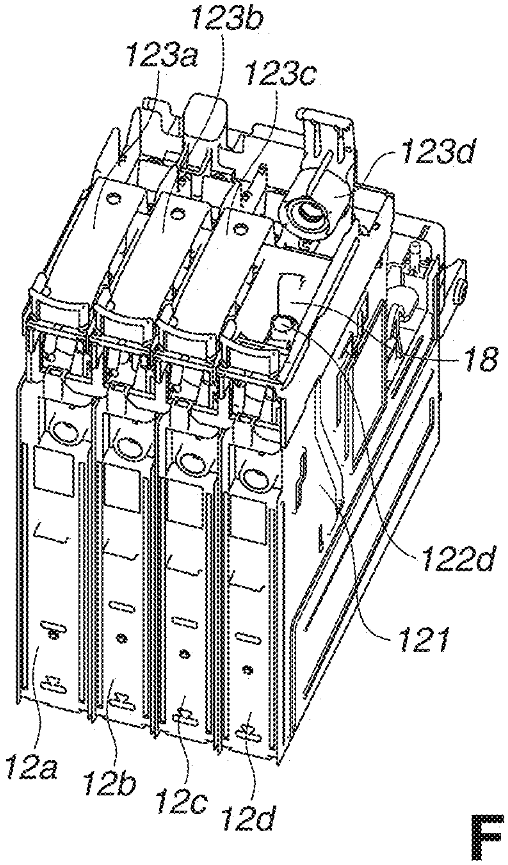
FIGS. 3A, 3B, and 3C are an enlarged perspective view, a plan view, and a sectional view, respectively, of a portion in which liquid tanks of the liquid discharge apparatus are mounted.
Figure 3B:
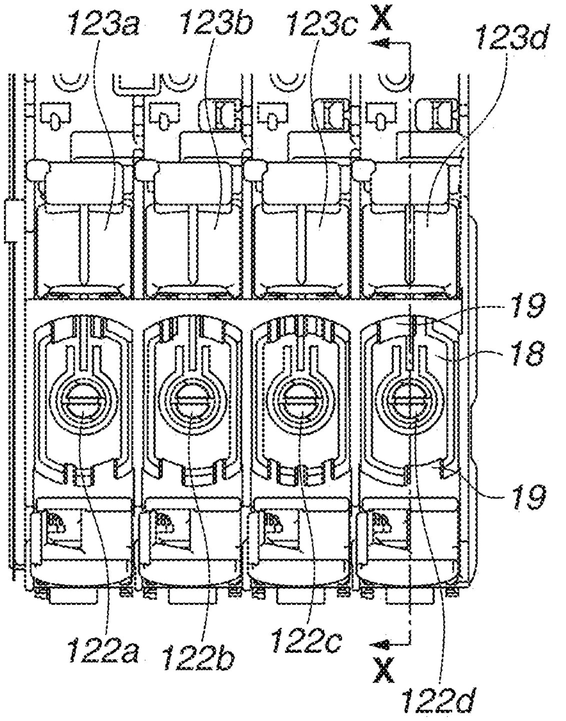
Figure 3C:
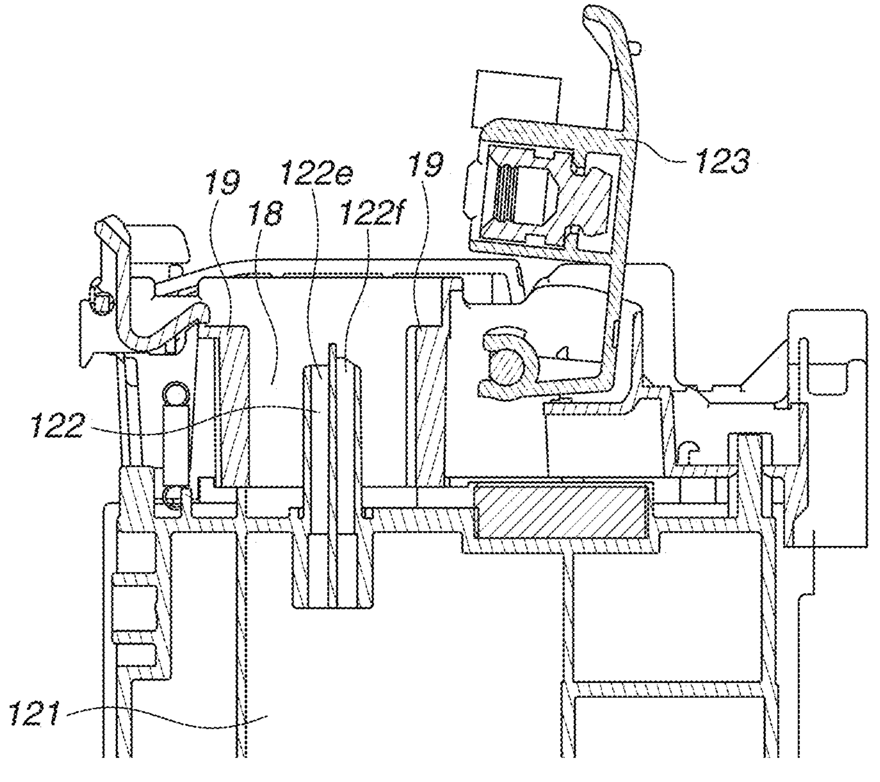

FIG. 3A is an example of an enlarged perspective view of a portion in which the liquid tanks 12*a* to 12*d* of the liquid discharge apparatus 1 illustrated in FIG. 1 are mounted. FIG. 3B is a plan view of the portion illustrated in the enlarged perspective view of FIG. 3A. Further, FIG. 3C is an X-X sectional view of the portion in FIG. 3B. Each of the liquid tanks 12*a*, 12*b*, 12*c*, 12*d* (i.e., liquid tank 12) includes a liquid tank body 121 for containing liquid, and a communication flow path 122*a*, 122*b*, 122*c*, 122*d* respectively communicating with a liquid chamber in the liquid tank body 121. Further, each of the liquid tanks 12*a*, 12*b*, 12*c*, 12*d* includes a tank cover 123*a*, 123*b*, 123*c*. 123*d* respectively attachable thereto to cover the communication flow path 122*a*, 122*b*, 122*c*, 122*d* respectively when the liquid tank 12*a*, 12*b*, 12*c*, 12*d* is not being replenished and to seal the liquid chamber of the liquid tank body 121.

FIG. 3A illustrates a state where only a tank cover 123*d* for the liquid tank 12*d* is open. In a case where the liquid tank 12 is replenished with liquid, an outlet port of a liquid container 2 (refer to FIGS. 4A and 4B) is inserted into the communication flow path 122 to inject the liquid. Evaporation of the liquid in the liquid tank 12 can be suppressed by sealing the liquid chamber with the tank cover 123 when the liquid tank 12 is not being replenished. The communication flow path 122 includes two flow paths 122*e* and 122*f* extending in parallel in a vertical direction, and the liquid in the liquid container 2 is injected into the liquid tank 12 due to gas-liquid exchange. In the liquid discharge apparatus 1, a socket 18 is arranged at a portion where the outlet port of the liquid container 2 is inserted. In the socket 18, protruding portions 19 protruding inward from an inner peripheral wall thereof are arranged. The socket 18 is arranged for each of the liquid tanks 12*a* to 12*d*, and shapes of the protruding portions 19 are different between respective sockets 18 of the liquid tanks 12*a* to 12*d* to prevent an erroneous insertion of the liquid container 2. The protruding portions 19 are located at positions of 180 degrees rotational symmetry with respect to the central axis of the communication flow path 122.

Figure 4A:
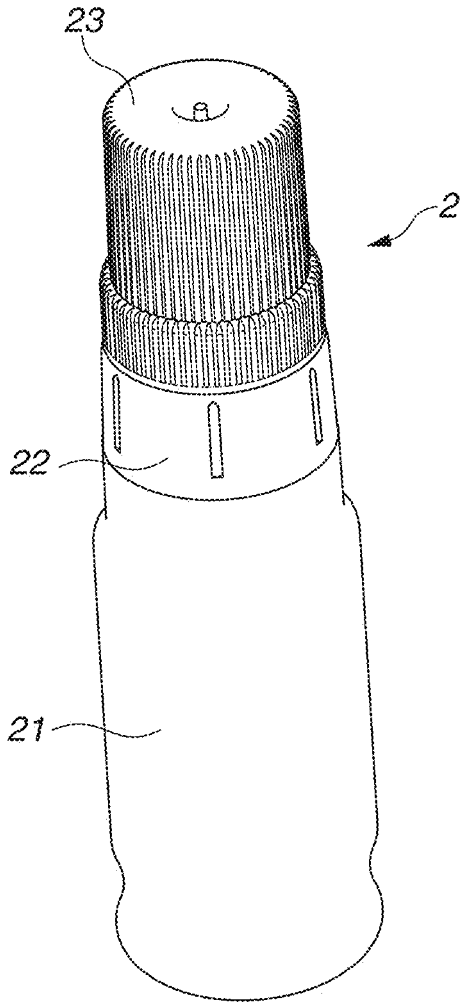
FIGS. 4A and 4B are perspective views each illustrating an external appearance of a liquid container.
Figure 4B:
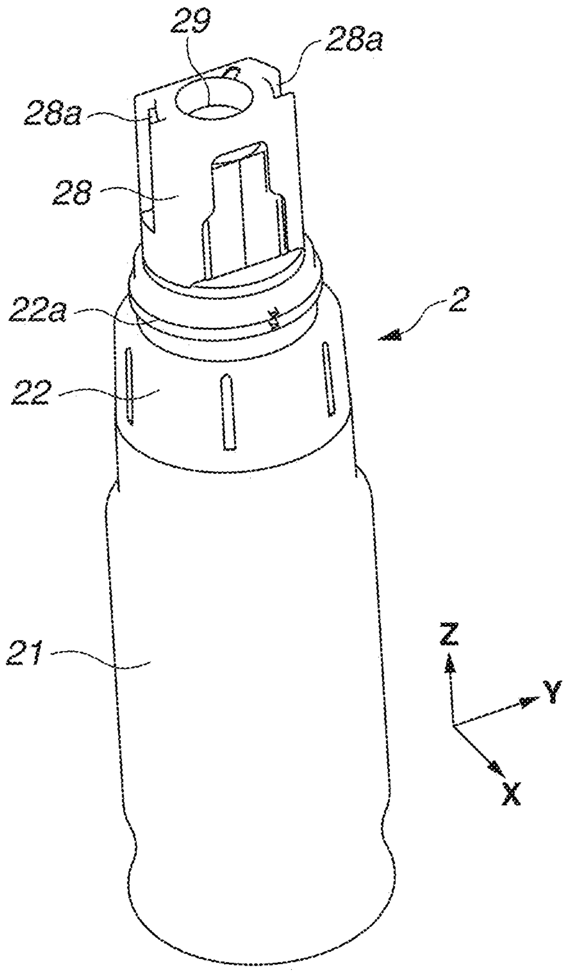

FIGS. 4A and 4B are perspective views each illustrating an external appearance of the liquid container 2 that is a liquid container used for replenishing the liquid tank 12 with liquid. The liquid container 2 in FIG. 4A includes a bottle 21 that is a liquid containing member (main body unit) for containing the liquid, a nozzle 22 connected with the bottle 21, and a cap 23 attachable to and detachable from the nozzle 22. The cap 23 is a cover member for shielding the inside of the liquid container 2 (more specifically, bottle 21) from external air by being attached to the nozzle 22. The nozzle 22 is an outlet portion having a function as an outlet when the liquid contained in the bottle 21 is discharged to the liquid tank 12.

FIG. 4B is a perspective view illustrating an external appearance of the liquid container 2 in a state where the cap 23 is removed from the liquid container 2. An outlet port 29 formed in the nozzle 22 is opened by removing the cap 23, and a cover 28 is joined to the nozzle 22 to cover the outlet port 29. A male screw portion 22*a* is formed on an outer peripheral surface of the nozzle 22, and the cap 23 is joined to the outlet port 29 by screwing together the nozzle 22 and the cap 23 using the male screw portion 22*a* of the nozzle 22 and a female screw portion (not illustrated) formed on an inner peripheral surface of the cap 23, to seal up an area around the outlet port 29. The cover 28 includes depressed portions 28*a* having corresponding shapes to the protruding portions 19 of the socket 18 in the liquid discharge apparatus 1, and the shapes of the depressed portions 28*a* are different depending on the types of ink, as with the socket 18. There are various methods for connecting the bottle 21 and the nozzle 22, such as a method of inserting a flexible member therebetween and sealing them and a method of forming the bottle 21 and the nozzle 22 with resin and welding the two components together. The bottle 21 and the nozzle 22 may be integrally formed.

Figure 5A:
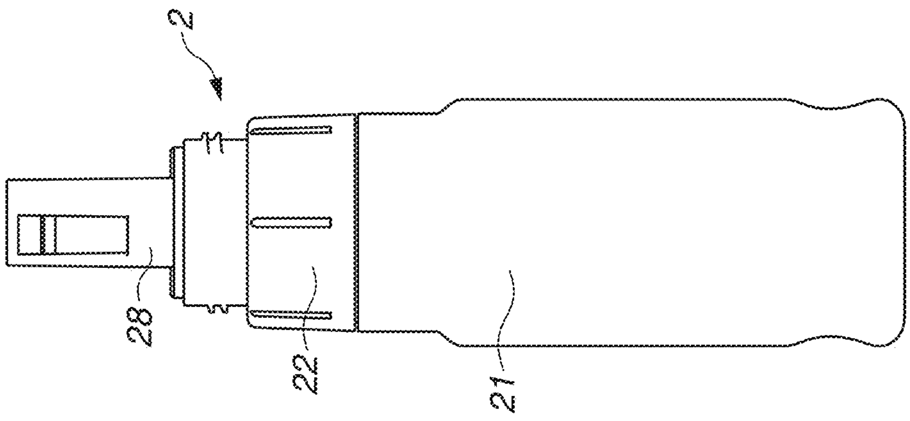
FIGS. 5A, 5B, 5C, and 5D are a front view, a side view, a top view, and a sectional view, respectively, of the liquid container.
Figure 5B:
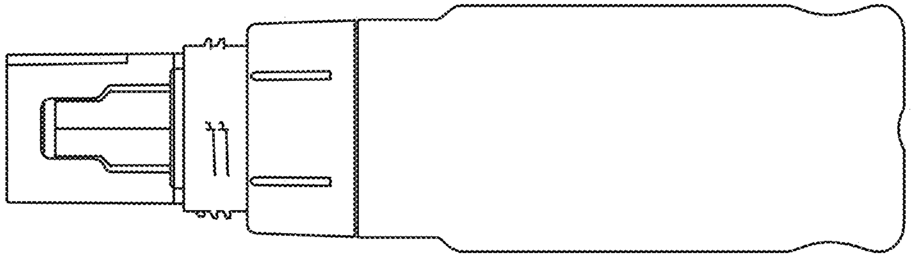
Figure 5C:
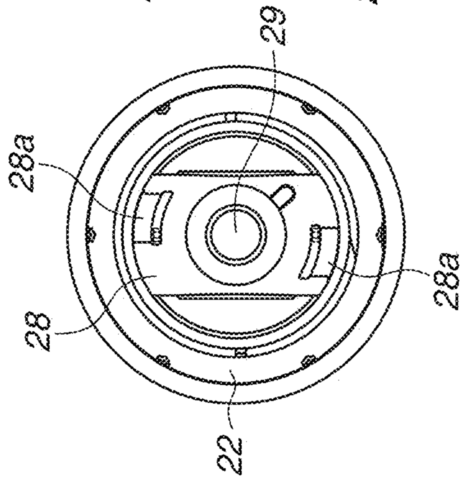
Figure 5D:
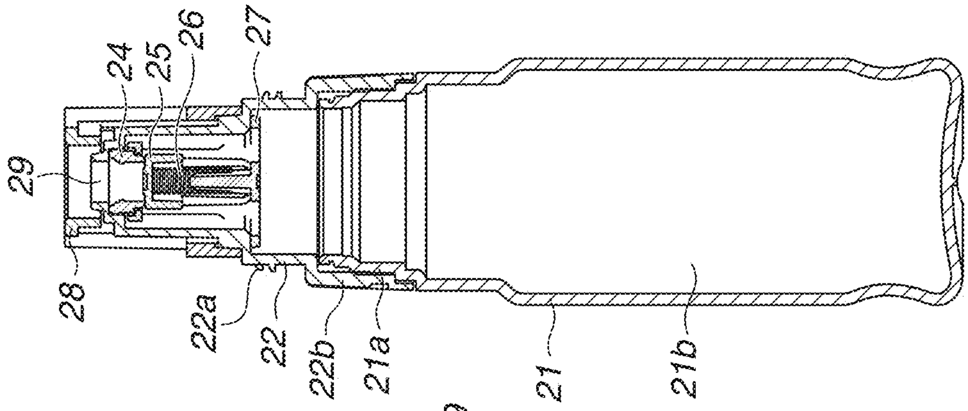

FIG. 5A is a plan view illustrating the liquid container 2 in a state where the cap 23 is removed illustrated in FIG. 4B viewed from a Y direction, FIG. 5B is a plan view of the liquid container 2 viewed from an X direction, and FIG. 5C is a top view of the liquid container 2 viewed from a Z direction. Further, FIG. 5D is a vertical sectional view of the liquid container 2 illustrated in FIG. 5B. The nozzle 22 joined to the bottle 21 includes the outlet port 29 at a leading end thereof, and the cover 28 is joined to the nozzle 22 so as to cover an entire circumference of the outlet port 29. More specifically, the outlet port 29 and the cover 28 (also referred herein as a protection portion 28) are formed separately and joined together over the entire circumference thereof by welding. Alternatively, the outlet port 29 and the cover 28 integrally formed are also included in the scope of the present disclosure.

After an ink replenishment operation is performed on the liquid discharge apparatus 1, ink may sometimes adhere to the inside or periphery of the outlet port 29. When the ink adheres to the vicinity of the outlet port 29, the ink can adhere to a user's finger or make a desk or the like dirty in a case where the user accidentally tips over the liquid container 2 at a time of closing the cap 23 or before closing the cap 23. However, with the present configuration, since the outlet port 29 is covered with the cover 28, it is possible to prevent a user from unintentionally touching the outlet port 29 and also prevent scattering of the ink.

An opening portion 30 of the cover 28 is located in a vertically upward direction of the outlet port 29, so that the user's finger does not easily touch the outlet port 29. Further, dimensions of the cover 28 are determined so that the lower side of a user's index finger entering the cover 28 from the opening portion 30 does not reach the outlet port 29 when the user touches the opening portion 30 with the user's index finger. Hereinbelow, a method of defining a size determination condition will be described.

Figure 6A:
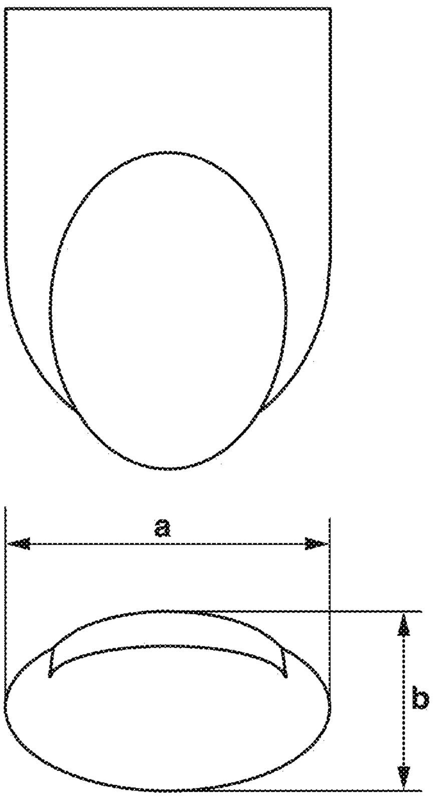
FIGS. 6A, 6B, and 6C are schematic diagrams illustrating a shape of a human finger, a positional relationship of the finger, a cover, and an outlet port, and a range of dimensions of the cover, respectively.
Figure 6A:
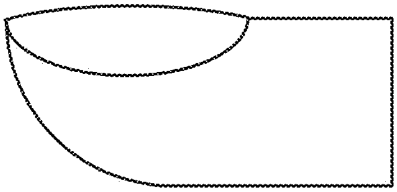

FIG. 6A is a plan view illustrating a user's index finger, and a width "a" of the user's index finger and a thickness "b" of the user's index finger are defined as illustrated in FIG. 6A. The user's index finger is assumed to have the shape of an elliptic cylinder with "a" as a long axis and "b" as a short axis so as to define a shape of the finger most likely to enter the opening portion 30. Particularly, based on data about Japanese people, for about 95% of the Japanese people, "a" is 13 mm or more and 17 mm or less ($13 \leq a \leq 17$), "b" is 11 mm or more and 15 mm or less ($11 \leq b \leq 15$).

In this case, since the finger may most likely enter the opening portion 30 when "a" and "b" are smallest (i.e., lower limit value), a case where the finger has the shape of the elliptic cylinder with "a" being 13 and "b" being 11 will be dealt with.

Figure 6B:
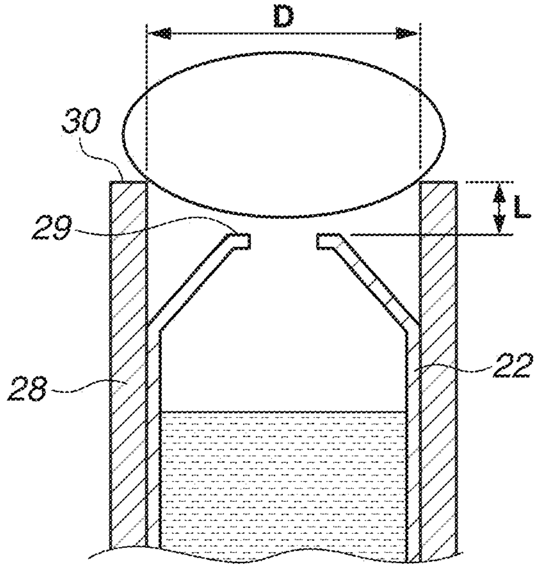

FIG. 6B is a sectional view illustrating a positional relationship between the user's finger, the opening portion 30, and the outlet port 29 when the user's finger touches the opening portion 30, and a state where the above-described elliptic cylinder is placed above the opening portion 30. When a distance L between the opening portion 30 and the outlet port 29 in the vertical direction is larger than a distance between the opening portion 30 and a lower end of the elliptic cylinder that has entered the cover 28 from the opening portion 30 in the vertical direction, the lower end of the elliptic cylinder does not reach the outlet port 29. More specifically, the condition in which the lower end of the finger that has entered the cover 28 from the opening portion 30 does not reach the outlet port 29 is expressed by following inequality (1), where the diameter of the opening portion 30 is defined as D.

$$L > 5.5 - 5.5\sqrt{1 - \frac{D^2}{169}}\ (D < 13). \tag{1}$$

Figure 6C:
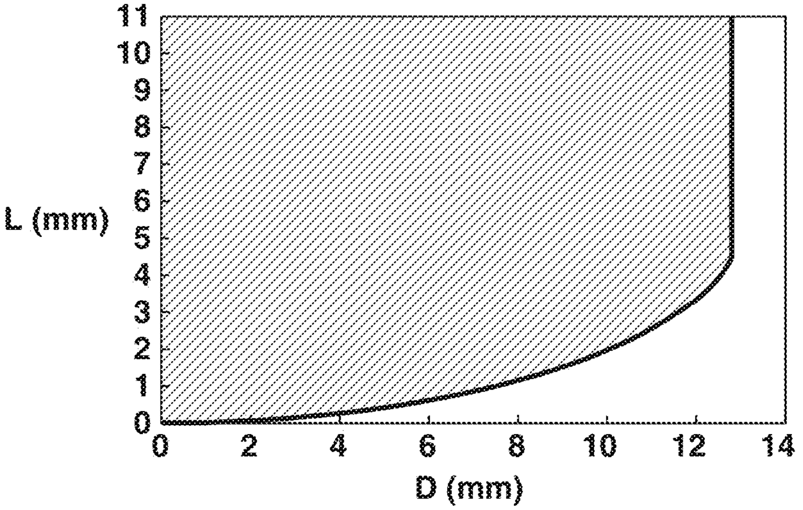

FIG. 6C is a graph illustrating a range expressed by the inequality (1), and as long as the dimensions of the cover 28 are within this range, since the distance L between the outlet port 29 and the opening portion 30 in the vertical direction is sufficiency secured, the lower end of the finger does not reach the outlet port 29 even when the diameter D of the opening portion 30 is large. Further, since the diameter D of the opening portion 30 is determined to be smaller than the width of the finger, it is possible to prevent the finger from entering the opening portion 30 in the vertical direction.

The cover 28 has a shape radially extending with the outlet port 29 as a center, and includes, on an extended portion, the depressed portions 28*a* corresponding to the shapes of the protruding portions 19 of the socket 18 of the liquid discharge apparatus 1. Thus, similar to the socket 18, the shape of the cover 28 is different depending on the type of ink. The shapes of the depressed portions 28*a* are point-symmetrically configured with the outlet port 29 as a center, and the liquid container 2 can be attached to the liquid discharge apparatus 1 even in a state where the liquid container 2 is rotated 180 degrees. In this case, by changing the shapes of the depressed portions 28*a* of the cover 28 based on the type of liquid contained in the liquid container 2, it is possible to visually recognize which type of liquid is contained in the liquid container 2. Further, by making the shapes of receiving-side members of the liquid discharge apparatus 1, into which the liquid container 2 is inserted, match the shapes of the depressed portions 28*a*, it is possible to use the shapes as a mechanical identifier (ID) to prevent erroneous insertion of the liquid container 2 by the user. More specifically, in a case where the liquid contained in the liquid container 2 is ink, there is a method of changing the shapes of the depressed portions 28*a* of the cover 28, which serve as the mechanical ID of the liquid container 2, depending on colors of the ink, such as cyan, magenta, yellow, and black.

The bottle 21 of the liquid container 2 includes a bottle welding portion 21*a* formed on an upper side thereof, and a liquid containing portion 21*b* formed on a lower side thereof. The nozzle 22 includes the outlet port 29 for discharging liquid, the male screw portion 22*a* having a male screw structure formed on an outer surface thereof, and a nozzle welding portion 22*b* with a welding surface formed on the inside or a bottom surface thereof. Examples of a material that forms the bottle 21 include polyethylene (PE) and polypropylene (PP). Examples of a material that forms the nozzle 22 include PE and PP. The nozzle 22 is joined to the bottle 21 by the nozzle welding portion 22*b* being welded to the bottle welding portion 21*a*. In a case where the bottle 21 and the nozzle 22 are joined by welding, it is desirable that the bottle 21 and the nozzle 22 be formed of materials of the same type. The nozzle 22 includes, on the inside, a seal 24 with an opening, a valve 25 for opening and closing the opening of the seal 24, a spring 26 for urging the valve 25, and a holder 27 for fixing the spring 26. Since the seal 24 prevents the liquid in the liquid containing portion 21*b* from leaking out in conjunction with the nozzle 22 and the valve 25, it is desirable that the seal 24 be formed using a material having flexibility, such as a rubber material and an elastomer material.

Figure 7A:
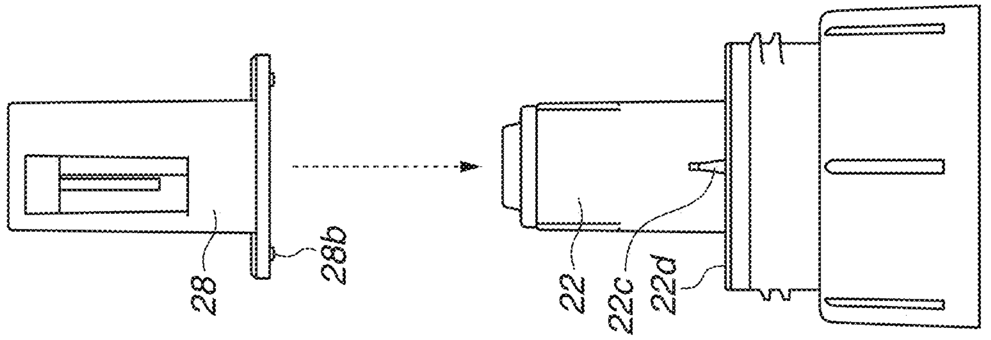
FIGS. 7A, 7B, and 7C are diagrams illustrating details of a cover of the liquid container.
Figure 7B:
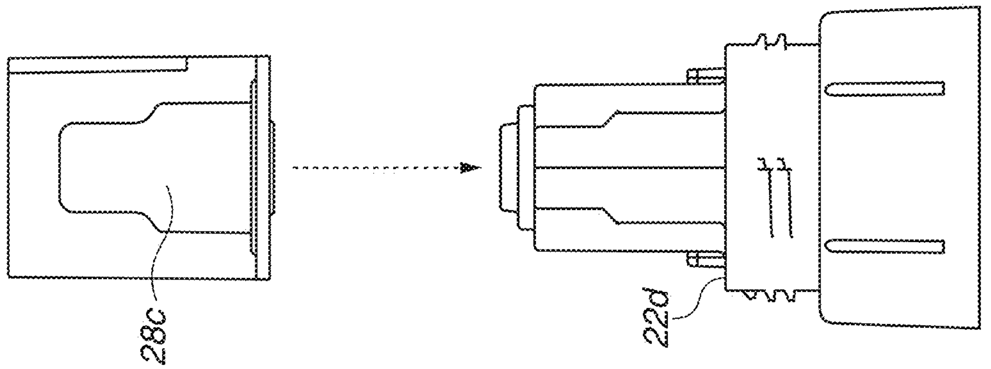
Figure 7C:
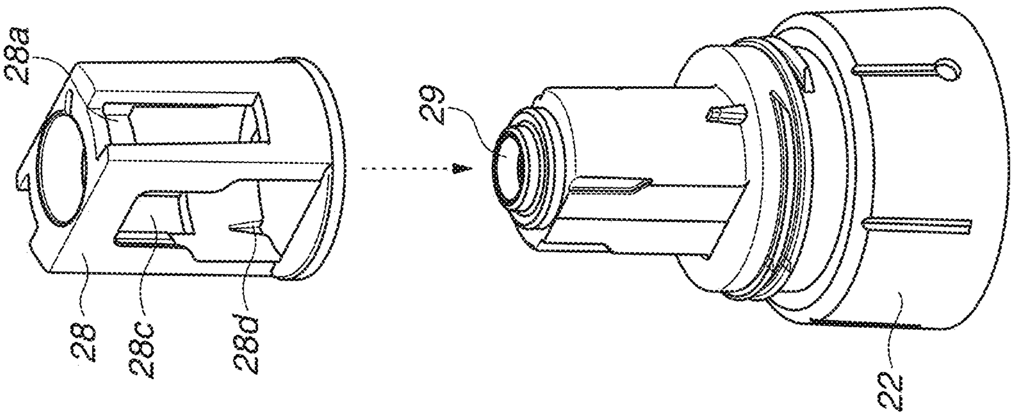

FIG. 7A is a front view illustrating a state before the cover 28 is joined to the nozzle 22 viewed from an X direction, FIG. 7B is a plan view of the state viewed from a Y direction, and FIG. 7C is a perspective view of the state.

In this configuration, the cover 28 is joined to the nozzle 22 by welding a bottom portion 28*b* of the cover 28 to a flat portion 22*d* of the nozzle 22. In FIGS. 7A and 7B, the flat portion 22*d* is configured on the same plane around the entire circumference of the outlet port 29, and the corresponding bottom portion 28*b* of the cover 28 is also configured on the same plane around the entire circumference of the outlet port 29. Accordingly, in a case where a minute ink droplet adhering to the vicinity of the outlet port 29 drips off after the ink replenishment operation performed on the liquid discharge apparatus is finished, the dripped ink droplet is blocked by a joining portion of the flat portion 22*d* and the bottom portion 28*b* and held in a space between the nozzle 22 and the cover 28. In this way, even in the case where the minute ink droplet drips off, it is possible to prevent the dripped ink droplet from leaking out. Further, since the depressed portions 28*a* corresponding to the shapes of the protruding portions 19 of the liquid discharge apparatus 1 are formed in the cover 28, a position shift between the outlet port 29 and the communication flow path 122 becomes large if the shift of a joining position between the cover 28 and the nozzle 22 is large. Bosses 22*c* are arranged to correspond to respective grooves 28*d* to increase positioning accuracy between the nozzle 22 and the cover 28.

A window 28*c* is formed in the cover 28 in the Y direction. In a case where the size of the liquid discharge apparatus 1 is to be reduced in the Y direction, since the width of the recording medium cannot be reduced, the width in the Y direction of the nozzle 22 of the liquid container 2 to be attached to the liquid discharge apparatus 1 needs to be reduced as much as possible. However, since an ink replenishment time becomes longer if the width of the communication flow path 122 is made smaller, the width in the Y direction of the nozzle 22 needs to be reduced while the width of the communication flow path 122 is secured. For this reason, the window 28*c* is formed in the cover 28 in the Y direction to reduce the width in the Y direction.

Figure 8B:
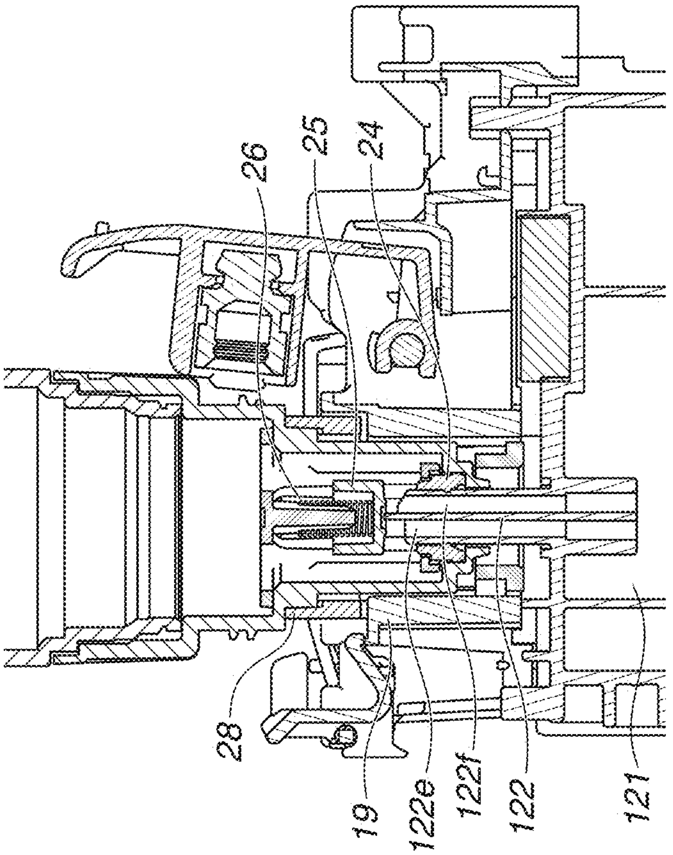
FIGS. 8A and 8B are a perspective view and a sectional view, respectively, illustrating a state where the liquid tank is replenished with liquid from the liquid container.
Figure 8A:
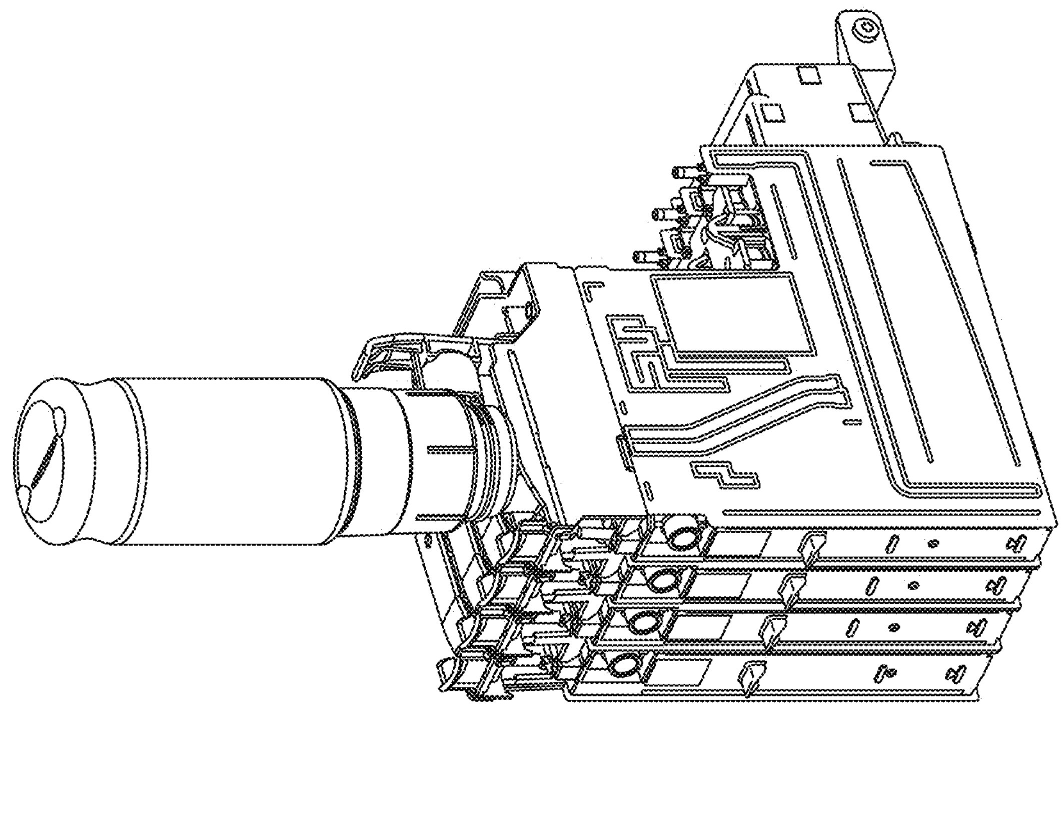

FIG. 8A is a perspective view illustrating a state as a liquid replenishment system where the liquid tank 12 of the liquid discharge apparatus 1 is replenished with liquid from the liquid container 2, and FIG. 8B is a sectional view illustrating an area around an attaching portion of the liquid container 2 and the liquid tank 12 in the above-described liquid replenishment state. When the liquid is injected from the liquid container 2 to the liquid tank 12, the liquid container 2 is attached so that the communication flow path 122 of the liquid tank 12 is inserted into the outlet port 29 of the nozzle 22 of the liquid container 2. At this time, the leading end of the communication flow path 122 moves the valve 25 toward the inside of the liquid container 2, and the inside of the liquid container 2 and the liquid tank body 121 become a communication state via the communication flow path 122. The communication flow path 122 includes the two flow paths 122*e* and 122*f*, and the liquid in the liquid container 2 is injected into the liquid tank 12 due to gas-liquid exchange. More specifically, the liquid moves from the liquid container 2 to the liquid tank body 121 through one of the flow paths 122*e* and 122*f*, and gas moves from the liquid tank body 121 to the liquid container 2 through the other one of the flow paths 122*e* and 122*f*.

Figure 9A:
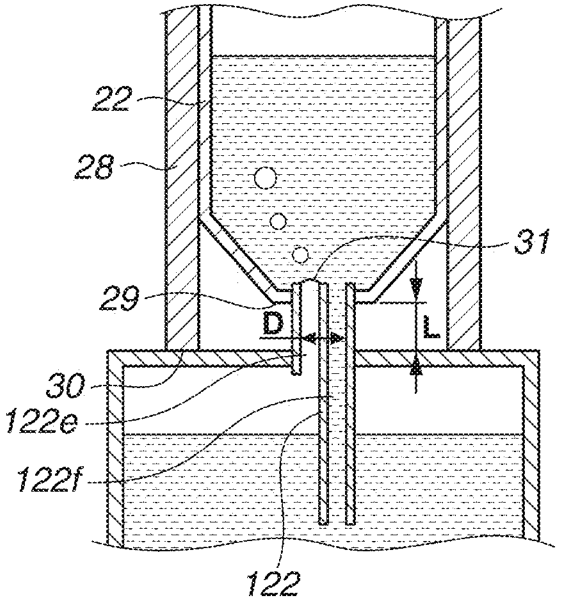
FIGS. 9A, 9B, and 9C are schematic diagrams illustrating a state where the liquid tank is replenished with liquid from the liquid container.
Figure 9B:
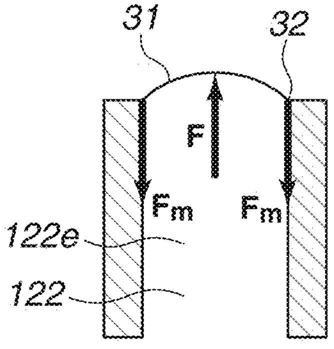

FIG. 9A is a schematic diagram illustrating a liquid supply mechanism, FIG. 9B is a schematic diagram illustrating a force acting on an air-liquid interface 31 generated in the flow path 122*e*, and a state where the air-liquid interface 31 collapses to move the liquid and the air due to an increase of a force F acting on the air-liquid interface 31 caused by a water head difference between the air-liquid interface 31 of the flow path 122*e* and the liquid surface of the liquid tank 12 by a meniscus force Fm acting on a contact line 32 between the air-liquid interface 31 and the flow path 122*e*, and the liquid is supplied from the liquid container 2 to the liquid tank 12.

Figure 9C:
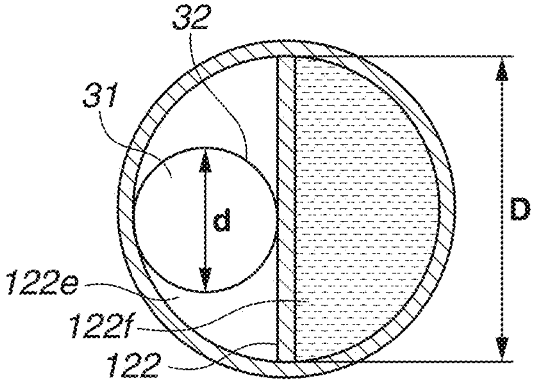

FIG. 9C is a projection view illustrating a shape of the air-liquid interface 31 of the flow path 122*e* projected in the vertical direction. In FIG. 9C, the contact line 32 is expressed by an inscribed circle with a diameter d in the flow path 122*e*. Since the diameter D and the diameter d are determined depending on the diameter of the outlet port 29, in a case where it is assumed that the communication flow path 122 is divided evenly into the flow path 122*e* and the flow path 122*f*, the diameter d can be replaced with a following formula.

$$d=D/2$$

At this time, the meniscus force Fm can be expressed by a following formula (2), where a surface tension of the liquid is defined as $\gamma$, and a contact angle of the liquid is defined as $\theta$.

$$F_m = \frac{\pi D\gamma\cos\theta}{2} \quad (2)$$

Further, in a case where the liquid sufficiently fills the liquid tank 12, since the water head difference required to collapse the air-liquid interface 31 can substantially be replaced by the distance L, the force F can be expressed by a following formula (3), where a density of the liquid is defined as $\rho$, and a gravitational acceleration is defined as g.

$$F = \rho g L \quad (3)$$

An actually used liquid is assumed where $\rho=1$ and $g=9.8$, and a strong meniscus force is assumed where $\gamma=40.6$ and $\theta=35°$. Then, the condition regarding the diameter D and the distance L in which the force F becomes larger than the meniscus force Fm and the liquid can be supplied from the liquid container 2 to the liquid tank 12 is expressed by following inequality (4).

$$L > \frac{27.2}{D} \quad (4)$$

Figure 9D:
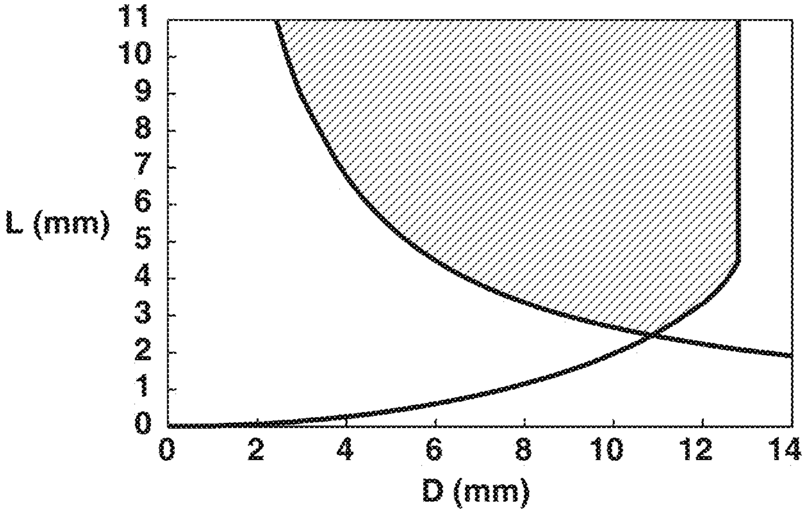
FIG. 9D is a graph illustrating a range of dimensions of the cover.

FIG. 9D is a graph obtained by adding a range expressed by the inequality (4) to the range expressed by the inequality (1), and since a sufficient water head difference can be secured even when the diameter D is small as long as the dimensions of the cover 28 are within this range, the liquid can be supplied without the user touching the outlet port 29.

Figure 10:
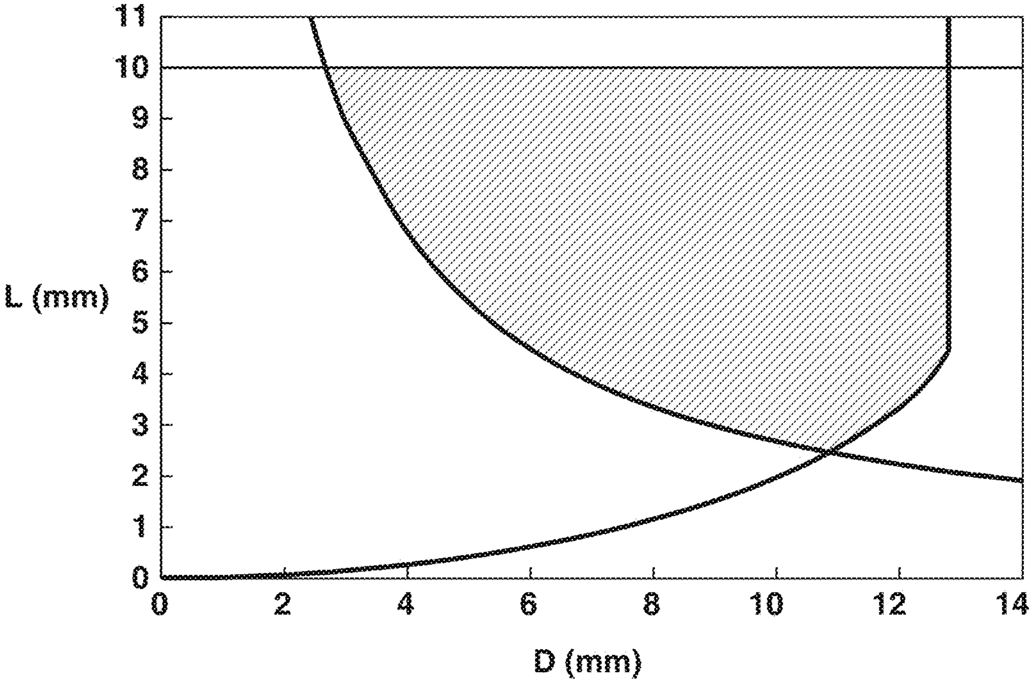
FIG. 10 is a graph illustrating a range of a distance and the diameter of the liquid container that can be easily handled.

In addition, if the distance L is long, the distance for the outlet port 29 to reach the needle becomes long when the liquid container 2 is attached to the liquid tank 12, and handling becomes difficult. Thus, it is more desirable to set L<10 (L is less than 10). FIG. 10 is a graph obtained by adding a range of L<10 to the ranges of the inequalities (1) and (4). If the dimensions of the cover 28 are within this range, the liquid can be supplied without the user touching the outlet port 29, and the handling becomes easy.

Figure 11:
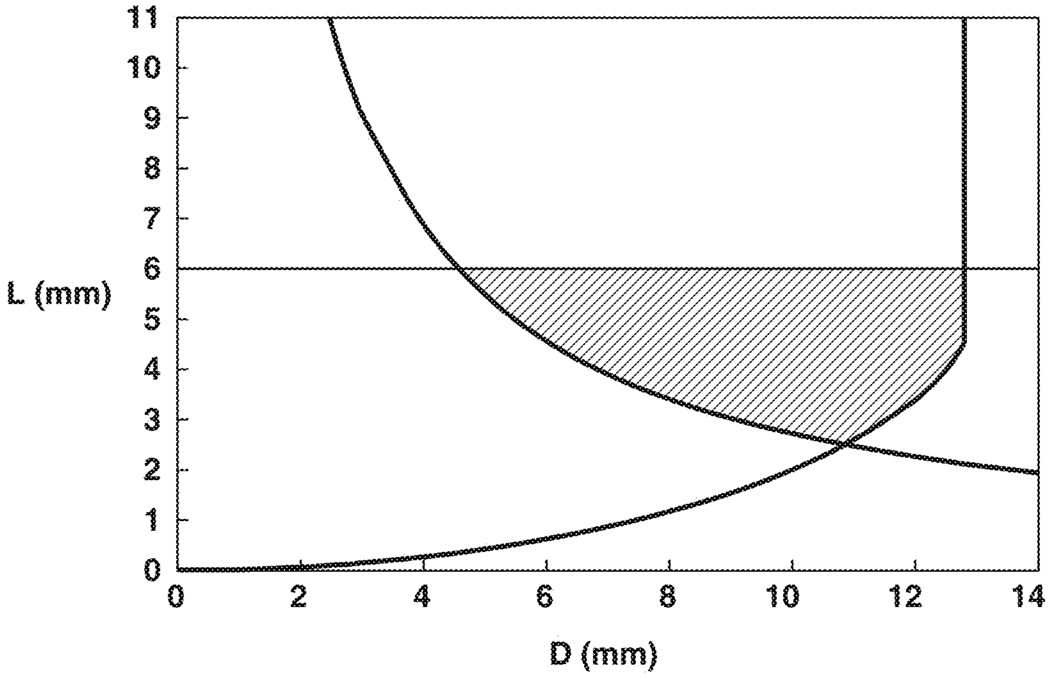
FIG. 11 a graph illustrating a range of the distance and the diameter that can achieve a comparatively small liquid discharge apparatus.

Further, if the distance L is long, the liquid tank 12 becomes large because the length of the needle of the liquid tank 12 becomes long. Thus, it is more desirable to set L<6 (L is less than 6). FIG. 11 is a graph obtained by adding a range L<6 to the ranges of the inequalities (1) and (4). If the dimensions of the cover 28 are within this range, the liquid can be supplied without the user touching the outlet port 29, and the liquid tank 12 can be made smaller.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084308, filed May 23, 2023, which is hereby incorporated by reference herein in its entirety.

What is claimed is:

1. A liquid container comprising:

a liquid containing portion configured to contain liquid;

an outlet portion including an outlet port configured to discharge therethrough the liquid contained in the liquid containing portion; and a protection portion surrounding the outlet portion at least partially and defining an internal space in which the outlet port is positioned, wherein the protection portion has a first opening portion in communication with the internal space, wherein, when the liquid container is oriented such that the first opening portion is directed upward, (i) the first opening portion and the outlet port are positioned along a vertical line, and (ii) the first opening portion is positioned above the outlet port, and wherein a diameter (mm) of the first opening portion is defined as D, and a distance (mm) between the outlet port of the outlet portion and the opening portion in the internal space as measured in a vertical direction is defined as L, inequality (1) is satisfied:

$$L > 5.5 - 5.5\sqrt{1 - \frac{D^2}{169}}\ (D < 13). \tag{1}$$

2. The liquid container according to claim 1, wherein the protection portion has a second opening portion on a side of the protection portion.

3. The liquid container according to claim 1, wherein the L satisfies inequality (4):

$$L > \frac{27.2}{D}. \tag{4}$$

4. The liquid container according to claim 1, wherein L is less than 10.

5. The liquid container according to claim 1, wherein L is less than 6.

6. The liquid container according to claim 1, wherein the liquid is ink.

7. A liquid replenishment system comprising:

an image recording apparatus including a liquid discharge head, and a liquid tank configured to contain liquid to be supplied to the liquid discharge head, the liquid tank having an inlet portion configured to receive injection of the liquid from outside; and a liquid container configured to supply the liquid to the liquid tank through the inlet portion of the liquid tank and comprising:

a liquid containing portion configured to contain liquid;

an outlet portion including an outlet port configured to discharge therethrough the liquid contained in the liquid containing portion; and a protection portion surrounding the outlet portion at least partially and defining an internal space in which the outlet port is positioned, wherein the protection portion has a first opening portion in communication with the internal space, wherein, when the liquid container is oriented such that the first opening portion is directed upward, (i) the first opening portion and the outlet port are positioned along a vertical line, and (ii) the first opening portion is positioned above the outlet port, and wherein a diameter (mm) of the first opening portion is defined as D, and a distance (mm) between the outlet port of the outlet portion and the opening portion in a vertical direction is defined as L, inequality (1) is satisfied:

$$L > 5.5 - 5.5\sqrt{1 - \frac{D^2}{169}}\ (D < 13). \tag{1}$$

* * * * *